United States Patent Office 3,763,072
Patented Oct. 2, 1973

3,763,072
SOIL ADHESION COMPOSITION OF ACRYLIC LATEX AND SODIUM SILICATE
Irving B. Krieger, Studio City, Calif., assignor to Pacific Architects & Engineers Incorporated, Los Angeles, Calif.
No Drawing. Continuation-in-part of application Ser. No. 751,762, Aug. 12, 1968. This application Nov. 23, 1970, Ser. No. 92,263
Int. Cl. C08f 45/24
U.S. Cl. 260—29.6 S          8 Claims

ABSTRACT OF THE DISCLOSURE

A method for forming a relatively thick semi-impervious crust on soil to inhibit erosion thereof comprising the steps of applying an aqueous composition to soil surface and allowing the composition to cure in the treated soil surface. The aqueous composition contains an aqueous 100% acrylic latex emulsion and sodium silicate.

This application is a continuation-in-part application of my co-pending application on Soil Adhesion Method and Composition, Ser. No. 751,762, filed on Aug. 12, 1968, and abandoned on Jan. 5, 1971.

BACKGROUND OF THE INVENTION

(1) Field of the invention

The invention relates to the field of soil adhesive methods and compounds.

(2) Description of the prior art

The treatment of soil particularly to prevent erosion from rain and wind has been an ever increasing problem. Several methods and compounds and solutions are presently available for treating soil to prevent erosion. These methods and compounds have various problems, such as being difficult to apply, not being very durable and therefore requiring reapplication, and having very limited strength and therefore not usable where loads may be applied to the soil. More specifically, the Theodore Whittelsey U.S. Pat. No. 1,882,377 discloses a method of treating the soil surface which comprises applying a mulch prepared from a fibrous comminuted material and waterproofing material, such as oil, asphalt, wax, rubber latexes and the like to the soil. This method has enjoyed limited success because (1) it is expensive and time-consuming and the mulch is difficult to prepare; (2) the mulch constitutes a serious fire hazard during hot, dry weather; (3) the mulch is unsightly; (4) the mulch often deters germination of plant seed; (5) the mulch is not bonded to the soil and will not adhere to steeply sloped soil surfaces where erosion is a serious problem; and (6) the mulch becomes hard and brittle in cold weather and is readily broken up and cracked by vehicle or large animal traffic. J. W. Lentz discloses a method of treating soil surfaces in his article on "How to Grow Grass on Roadsides," published in the April 1949 edition of Public Works, vol. 80, No. 4, pp. 30–32. The Lentz method comprises seeding, fertilizing and watering the top soil surface, covering the surface with straw and applying an asphalt emulsion thereover. This method has enjoyed limited success principally because it possesses the same drawbacks as the Whittelsey method. The John C. Eck U.S. Pat. No. 2,847,392 discloses a method of improving the porosity of soil having low porosity which comprises impregnating the soil with a coagulable latex mixture consisting essentially of a water-insoluble, non-electrolyte, elastomeric polymer preferably prepared from conjugated diene monomers having from 4 to 6 carbon atoms. This method also has enjoyed limited, if any, success and has little effect in inhibiting erosion. The Bernard Coe U.S. Pat. No. 2,961,799 teaches a method of treating soil to protect the soil from erosion and to enhance the germination of seeds in the treated soil. The method comprises forming on the soil surface a film of rubber by applying to the surface a latex composition comprising from 0.5 to about 10% by weight of a water-insoluble rubber and from 0.0005 to about 0.5% of a water-soluble counterpenetrant for the rubber. This method has limited utility. The treated soil has only a surface film of rubber to protect it from erosion; the film is readily fractured and cracked by vehicle or animal traffic; and once the protecting film is ruptured, wind and water readily undercut the film and cause serious sectionalized erosion that eventually destroys the entire protective film by moving the film's earth support.

In underdeveloped countries there is a need for an inexpensive, durable building material which can be used in the manufacture of durable blocks or bricks from which homes and other shelters may be built. Preferably the blocks or bricks should be manufactured from an indigenous material such as soil. What is ultimately required is an adhesive that will allow the indigenous material to be utilized in the preparation of a durable brick without the need for firing, cement or paint.

SUMMARY OF THE INVENTION

A method of treating soil to prevent wind and water erosion thereof, and a composition to effect such treatment; more particularly, it is an object to provide a composition for treating soil, so that the soil will be adhesive, comprising a mixture of acrylic emulsion polymer and sodium silicate. A wetting agent, ultra-violet light absorber and water-soluble polyoxygenated alcohols are optionally added to the mixture to increase its utility. The composition is applied to the soil in an aqueous solution by spraying or other known means. The composition can be mixed with soil, and the like, the resulting mixture can be formed into bricks, and the bricks can be allowed to set to form durable bricks which can be used in building homes and other structures.

It is an object of this invention to provide a method and composition which can be applied to soil to prevent wind and water erosion thereof. More particularly it is an object to provide a method of treating soil which is inexpensive, relatively easy to practice, and capable of the treatment of large areas in relatively short periods of time.

Another object of the present invention is to provide a method and composition for erosion and dust control of soil which do not constitute a fire hazard. More particularly, it is an object to provide a method and composition which leave the treated soil substantially untouched with respect to appearance.

And still another object of the present invention is to provide a method and composition for the preparation of a relatively thick impervious or semi-impervious crust on the soil. More particularly it is an object to provide a method of preparing a relatively thick, tough, durable, impervious crust on the top surface of soil which is unaffected by sunlight, rain, wind and vehicle and animal traffic.

It is still a further object of this invention to provide a composition which can be used to facilitate dust control.

It is still a further object to provide a composition which may be utilized on an area for erosion and dust control where the area is subject to vehicle and animal traffic, such as parking lot, barnyard areas, and the like.

Another and further object of the present invention is to provide a method and composition for the preparation of durable earth bricks and blocks for building.

DETAILED DESCRIPTION OF THE INVENTION

The present method of erosion and dust control of soil comprises applying the aqueous composition of the present invention to the soil and allowing the soil and composition to dry and cure to form a semi-impervious crust on the upper surface of the soil. The aqueous composition has a solids content of between about 0.5% and about 6% and is applied in amounts sufficient to insure that the treated soil receives between 300 and 500 pounds of solids per acre, which is equivalent to between about 80 and 110 gallons of the concentrate.

Between 800 and 6000 gallons of the aqueous composition are applied to each acre of soil. For most purposes between about 2500 and 5000 gallons of aqueous composition are used per acre. The aqueous composition is applied by spraying, flooding or brushing, preferably by spraying.

The present method can be practiced on dry soil, hot soil, moist soil or cold soil. Preferably the method is conducted on dry or moist soil above freezing, preferably 60° F. or above.

The method can be conducted during the heat of the day; preferably the method is conducted during fair weather at temperatures between 60° F. and 85° F.

The surface of the soil or earth to be treated does not have to be pre-conditioned in the practice of the present method, that is, the surface does not have to be cleared of vegetation and growth, pre-moistened or dried, broken up, plowed up, rototilled or the like. In the preferred embodiment of the present method, the surface of the earth is cleared of vegetation, broken or plowed up, and moistened with water, if necessary. The surface of sloped areas is preferably contoured or worked over with a sheep foot roller or the equivalent to imprint the sloped surface with a plurality of small surface reservoirs.

When the soil surface is impervious, very dry, or wet, the composition is preferably applied in two or more applications to insure the preparation of a relatively thick and impervious crust. For impervious or very dry soil, the composition is applied in a dilute form containing about 0.5% to about 4.0% solids with at least 3000 gallons of the aqueous composition being applied per acre; preferably 4500 gallons or more. A second application of the composition is carried out before the first application has had time to set and form an impervious layer. Generally the second application follows the first application within 2 to 8 hours. If needed, a third et seq. applications of the aqueous compositions may be carried out to provide that each acre of soil is treated with between about 300 and 500 pounds of solids. For wet soil, e.g., soil that has experienced a heavy rainfall, flooding or irrigation, the composition is applied in a more concentrated form containing about 4% to about 6% solids with no more than about 3000 gallons of the aqueous composition being applied per acre, preferably 2000 gallons or less. A second application of the composition can follow the first application if needed.

The present method can also be used in hydro-seeding and hydro-mulching. That is, the aqueous composition can be formulated with seeds, and optionally with fertilizer, to form a slurry or mixture which can be applied on the soil surface by a hydraulic applicator device such as a Finn Hydro-Seeder or a Bowie Hydro-Mulcher hydraulic applicator device. The composition upon drying and curing, will prevent the seed from being washed or blown away. Likewise, the aqueous composition can be formulated with a fibrous mulch and hydraulically applied on the soil surface. For this type of application at least 2000 gallons of the aqueous composition (solids content between about .8% and about 2%) are employed per acre of land, preferably 4500 gallons or more.

The present method has been shown to be very successful in inhibiting water erosion on sand, loam and clay soils. These soils were subject to artificial rains at slopes of 60 and 100 percent—percent slope is the amount of horizontal rise or fall in feet per 100 feet of vertical distance. The soils were subject to a rain equivalent to 17 inches of rainfall at the rate of nearly 3 inches per hour. The degree of erosion is shown in the following tables:

| | Loam, 60 percent slope | | | | |
|---|---|---|---|---|---|
| | Control | A | B | C | D |
| Total run-off (in.) | 8.26 | 7.67 | 11.12 | 5.34 | 14.0 |
| Total addition (in.) | 17.0 | 17.0 | 17.0 | 17.0 | 17.0 |
| Total time (hr.) | 6.0 | 6.0 | 6.0 | 6.0 | 6.0 |
| Soil erosion (T/A) | 24.94 | 0.63 | 0.51 | 0.81 | 3.25 |
| | Clay, 60 percent slope | | | | |
| Total run-off (in.) | 3.83 | 8.87 | 10.93 | 3.73 | 1.07 |
| Total addition (in.) | 17.0 | 17.0 | 17.0 | 17.0 | 17.0 |
| Total time (hr.) | 6.0 | 6.0 | 6.0 | 6.0 | 6.0 |
| Soil erosion (T/A) | 0.73 | 0.04 | 0.04 | 0.09 | 0.03 |
| | Sand, 60 percent slope | | | | |
| Total run-off (in.) | 0.69 | 9.78 | 15.70 | 0.69 | 0.68 |
| Total addition (in.) | 17.0 | 17.0 | 17.0 | 17.0 | 17.0 |
| Total time (hr.) | 6.0 | 6.0 | 6.0 | 6.0 | 6.0 |
| Soil erosion (T/A) | 0.03 | 0.03 | 0.67 | 0.03 | 0.03 |
| | Loam, 100 percent slope | | | | |
| Total run-off (in.) | 3.5 | 3.2 | 2.6 | 1.33 | 2.4 |
| Total addition (in.) | 4 | 4 | 4 | 4 | 4 |
| Total time (min.) | 45 | 45 | 45 | 45 | 45 |
| Soil erosion (T/A) | 29.4 | 0.22 | 0.01 | 0.04 | 0.04 |

NOTES:
T/A = tons/acre.
Clay and sand soils slumped at 100 percent slopes and could not be tested.
A = Soil treated with aqueous composition containing 1% concentrate in amount equal to 4,500 gallons of the composition per acre of soil.
B = Soil treated with aqueous composition containing 2% concentrate in amount equal to 4,500 gallons of the composition per acre soil.
C = Soil treated with aqueous composition containing 5% concentrate in amounts equal to 900 gallons of the composition per acre of soil.
D = Soil treated with aqueous compositions containing 10% concentrate in amounts equal to 900 gallons of the composition per acre of soil.

The soil was treated according to the present method employing a 24 hour drying and curing time.

The aqueous composition, upon drying and curing in the soil, forms a crust which is semi-impervious and reduces water infiltration into the soil. The active ingredients in the composition form an adhesive latex which binds the soil particles together. The sodium silicate and water-soluble polyoxygenated alcohol assist the composition in penetrating into the soil to prevent the formation of a mere surface layer of the acrylic polymer.

In contrast to most erosion control mixtures, the volume of water used in the application of the aqueous composition to the soil is the determining factor in erosion control, rather than the amount of concentrate the soil receives. Greater or deeper penetration of the aqueous composition into the soil is achieved by employing greater amounts of water in the composition. The thickness of the erosion resistant crust is dependent upon the depth of penetration by the composition.

The crust or layer that is formed after the composition has been applied and allowed to dry and cure is strong, durable and resistant to damage by water runoff. When the crust is moistened by rain, irrigation water, or the like, the crust composition is wetted, swells and becomes tacky and flexible rendering the crust resistant to water infiltration.

The present composition is prepared and handles in two forms: a concentrate and a diluted aqueous composition form. The concentrate is the form conveniently used for storage and transportation. The diluted composition form is used for application and practice of the present method. The aqueous composition is normally prepared from the concentrate.

The present composition is comprised of an acrylic emulsion polymer and aqueous sodium silicate.

A wetting agent is optionally provided to enable the compound to more readily penetrate the soil. In addition, an ultra-violet light absorber is optionally provided to enable the compound to be durable in the presence of ultraviolet rays. An anti-foaming agent is preferably used in compounding the dilute composition from the concentrate in order to prevent foaming.

The 100%-acrylic latex emulsion is an aqueous latex emulsion of a homopolymer of lower alkyl esters of acrylic acid or an alpha-lower alkyl derivative thereof, that is a lower alkyl ester of an alpha-lower alkyl acrylic acid, or copolymers thereof, that is polymers made of two or more different acrylic acid esters and/or alpha-lower alkyl acrylic acid esters. By "lower alkyl" is meant alkyl groups having from 1 to 4 carbon atoms. Typical lower alkyl groups include: methyl, ethyl, propyl, isopropyl and butyl. The 100% acrylic latex emulsions are known and commercially available. Any one of numerous commercially available 100% acrylic latex emulsions may be used. For example, the Rhoplex brand acrylic emulsions produced by Rohm and Haas Co., Philadelphia, Pa., the UCAR brand all acrylic latex emulsions produced by Union Carbide, New York, N.Y., and the acrylic emulsions produced by Celanese and the like, are suitable for the present invention. In the preferred embodiment of the invention, the 100% acrylic latex emulsion will have a solids content of between about 45 and about 51%, preferably about 46 to about 47%, a pH of between about 9 and about 10, a specific gravity of solids of about 1.15, a weight of about 9 pounds per gallon and a viscosity of about 73 to about 92 Krebs units. The acrylic polymer in the composition provides a substantial portion of the solids content in the composition and in the erosion inhibiting crust or layer which forms when the composition is applied to the soil as described above.

The aqueous sodium silicate can be either an aqueous solution of suspension of sodium silicate. Commercially available aqueous sodium silicate solutions and suspensions are used, such as Water Glass or the aqueous sodium silicates produced by Philadelphia Quartz Co., Philadelphia, Pa. (brands C, D, E, J, JA, K, N and S aqueous sodium silicates have been found suitable for the present invention). In the preferred embodiment of the present invention, the aqueous sodium silicate will have a relatively low alkalinity of a ratio of 1 ($Na_2O$): about 2 to about 4 ($SiO_2$), preferably: about 3.2, and a density of about 35 to about 60 degree Baumé (° Bé.), preferably about 41° $B_e$ The aqueous sodium silicate appears to enhance the soil permeability of the aqueous composition and strengthen the soil erosion inhibiting crust.

In the preferred embodiment of the present invention, the composition contains an organic compound having at least one hydroxy group. Water-soluble polyoxygenated compounds used in the present composition include: B-hydroxy ketones, such as diacetone alcohol, glycols such as ethylene glycol, propylene glycol, glycerine, polyglycols such as diethylene glycol and water-soluble polyethylene glycol, and the mono esters and mono ethers of glycols and polyglycols such as diethylene glycol acetate, the methyl ether of dipropylene glycol, a water-soluble butyl ether of polypropylene glycol and the like. The preferred water-soluble polyoxygenated compound is diacetone alcohol. The water-soluble polyoxygenated compound is believed to enhance, together with the sodium silicate, the soil permeability characteristics of the aqueous composition. The polyoxygenated compound also appears to enhance the wettability of the soil erosion inhibiting crust.

In the concentrate form the composition can contain by weight from about 89% to about 99% of a 100%-acrylic latex emulsion, and from about 1% to about 10% aqueous sodium silicate. In the preferred embodiment the concentrate will contain from about .025% to about 1% of a water-soluble polyoxygenated organic alcohol. Optionally the concentrate can contain by weight about 0.25% or less of a wetting agent, about 0.25% or less of an ultraviolet light absorber, about 0.2% or less of an anti-foaming agent, and/or about 5% or less water. In the preferred embodiment of the invention, concentrate will comprise by weight about 97% to about 99% of 100%-acrylic latex emulsion, about 1% to about 3% of aqueous sodium silicate and about .2% to about 1% of a water-soluble polyoxygenated organic alcohol. The concentrate contains between about 45% and 51% solids, and weighs about 9.0 pounds per gallon.

The following proportions and method are suitable for producing approximately 50 gallons of concentrate, having a weight of approximately 450 pounds. The weights given herein should be utilized with a tolerance of ±4% unless a statement is made to the contrary. The compound may be mixed in any steel tank. A steel tank with an epoxy-phenolic liner has been found to be particularly suitable. 420 pounds of 100%-acrylic emulsion polymer are placed in the tank. Any one of numerous commercially available 100%-acrylic emulsion polymers may be used. A polymer with the following characteristics has been found to be particularly suitable when mixed with the other constituents of the compound contained herein.

Solid content—46% to 47%, pH 8 to 10
Specific gravity of the solids—1.15 to 1.17
Approximate weight—9 lbs. per gallon.

An anti-foaming agent is added to the polymer. The purpose of the agent is to prevent foaming during the mixing and spraying of the compound. Any one of a number of commercially available anti-foaming agents may be used such as NYZ or NXZ liquid manufactured by Nopco. Approximately 1 pound, preferably about ¾ pound, of anti-foaming agent is added to the emulsion. The addition of two much anti-foaming agent will cause a breakdown of the emulsion. The two materials are mixed by agitation in the steel tank for about 15 minutes. A vertical, overhung shaft-type agitator has been found to be very suitable in this application. This operation is performed at room temperature.

In a separate container, a second mixture is formed first by placing approximately 8–12 pounds of water in the container. Ten pounds of water has proven to be most effective in forming the compound. Next, approximately half a pound of a wetting agent is added to the water. The addition of too much wetting agent will cause a deterioration of the emulsion. The wetting agent may be any chemical agent which will assist the compound in penetrating soil. Numerous commercially available wetting agents may be used such as Triton X–415 (a p-isooctylpolyoxyethylenephenol polymer) manufactured by Rohm and Haas or, alternatively, a solution comprising 75% Maconal (NR) and 25% Igopon. These latter two chemicals may be mixed in water, filtered and added to the second mixture. Octylphenoxy polyethoxyethanol nonionic detergents have been found to be suitable wetting agents for the present composition.

An ultra-violet absorber is added to approximately 1 pound of a water-soluble polyoxygenated alcohol. The resulting mixture is added to the second mixture. The absorber is utilized to prevent the compound from deteriorating in the presence of ultra-violet rays such as those found in sunlight. Any one of numerous ultra-violet light absorbers may be utilized such as Cyasorb No. 9 or Uvinol 490. Approximately a half pound of the ultra-violet absorber is added to the second mixture.

Aqueous sodium silicate is also added. The sodium silicate assists in making the compound semiwater impervious, once it is dried, and also adds to the solid content of the compound. M-grade sodium silicate having a 40° to 50° Bé. has been found particularly suitable for this application. Approximately 17 pounds of the sodium silicate is added to the second mixture.

A water dispersable pigment may be added to the second mixture in order to give the compound a desirable color. Any light, stable, water dispersable pigment may be used, such as carbon black or phthalo cyanine green. Approximately 2–3 oz. of the phthalo green added to the second mixture has been found to be an adequate quantity. The amount of pigment added to the mixture is not critical.

The order in which the water, wetting agent, drying agent, pigment and sodium silicate are added in the second mixture is not critical. However, in the preferred embodiment of this invention, an aqueous polyoxygenated alcohol solution is first made up and combined with the ultra-violet absorber. The wetting agent, the anti-foaming agent, the water-dispersable pigment and aqueous silica are then added to the aqueous solution in that order respectively with thorough mixing at each stage or addition step. The mixture of these elements is passed through a high speed mill such as a Cowles mill for about 10 minutes at approximately 1500 to 2000 feet per minute. All of the above-described mixing is performed at room temperature.

This second mixture is then slowly added into the tank containing the polymer and anti-foaming agent. The total concentrate is then mixed for approximately ½ hour. Mixing should occur at a room temperature of approximately 70° F.

The present concentrate can optionally be formulated with a herbicide such as Simazine 80 W or Atrazine 80 W herbicides produced by Giegy Chemical Co. The use of the present aqueous composition extends the useful life of herbicides by inhibiting their loss from the soil due to evaporation, and dilution and leaking by water. This in turn promotes the effectiveness of the herbicide and the long range effect of the herbicide on vegetation. Sufficient herbicide is formulated with the concentrate to provide that about 6 to about 50 pounds of herbicide are applied to each acre of soil. Alternatively, the herbicide can be formulated with the aqueous composition rather than with the concentrate.

The concentrate is diluted with water to form the aqueous composition that is employed in the above-described method of erosion and dust control. The concentrate is diluted with water in a volume ratio of between 1:7 and 1:75 (concentrate:water) to provide that the aqueous composition contains between about 1% and about 12% concentrate (a solids content of between about .5% and about 6%). For most applications, the concentrate is diluted in the ratio of between about 1:20 and about 1:60 to provide that the aqueous composition contains between about 1.6% and about 5% concentrate (a solids content of between about .8% and about 2%). As described above, a sufficient amount of the aqueous composition is applied to the soil to provide that each acre of soil receives between about 300 and about 500 pounds of solids (principally the latex polymer and sodium silicate) which is equivalent to between about 80 and about 110 gallons of the concentrate.

The dilution can be performed in a holding tank having mixing or agitating means, or in a continuous metered mixer, such as a Hydrofeeder or Vortex mixer. When the concentrate is formulated without an anti-foaming agent, an anti-foaming agent is preferably added during the dilution step in order to prevent excessive foaming during mixing and during the application step. Nopco NXZ liquid anti-foaming agent has been found suitable for this purpose. About 1 pound of the anti-foaming agent per 600 pounds of concentrate has been found to work well.

The aqueous composition has been shown to have little effect on the pH of soil (less than .1 pH unit) and appears to have no detrimental effect on seed germination. Thus seeds can be applied to the soil with the aqueous composition; the latex when dried and cured assists in bonding the seeds to the soil surface and inhibits them from being swept away by water runoff or wind.

The aqueous composition has also been shown to have a significant effect in determining moisture loss from soils. For example, independent tests have shown that the composition decreases the evaporation rate from sand by almost 50% and from loam soil by about 25%.

The above disclosed aqueous composition is particularly suitable for use on soil surfaces which will be utilized for parking lots, roads, airport taxiways, etc. The surface can be plowed, and then sprayed to a depth of 6–8 inches, with a Rototiller or similar device. A solution of 2% concentrates and 98% water by volume is utilized. The spraying may be accomplished with a spray truck or any commonly available spraying devices. The spray nozzle should be at least 12–18 inches above the soil surface. The spraying device should move at approximately 3–5 miles per hour with a nozzle pressure of 40–50 p.s.i. Approximately one hour after the first application of compound, the soil is again plowed and resprayed. Next, the soil is compacted with a roller or other compactors. A light coating of compound may again be added to the soil after it has been compacted. The sprayed area will be ready for light traffic in about 24 hours and for heavy or normal traffic in about 48–72 hours. The aqueous composition is preferably not used after a heavy rainfall or in freezing weather.

A solution of a compound may be applied to slopes to prevent erosion. The slopes should be dampened with water and all loose material removed from the surface. The slopes are then sprayed with a 2% solution of concentrate in the water. For a hand spraying unit, the spray should be lightly applied with a nozzle pressure of 40–50 p.s.i. and with the nozzle held approximately 18 to 20 inches away from the surface. The slopes should be resprayed approximately 1 hour after the first application. Best results are obtained when the spray is applied in ambient temperatures of 60° F.–85° F.

The compound may be also utilized for the manufacture of bricks. The resulting bricks are suitable for use in housing or other shelters. The building bricks are manufactured with any one of numerous molding techniques. A 4% to 10% solution of concentrate in water is mixed with soil and then placed into a mold. About 1–4/10 gallons of compound to 13–6/10 gallons of this solution mixed with one cubic yard of soil has been found to be a suitable proportion for bricks. In addition, sea water may be utilized in mixing the compound. Once the bricks dry they may be utilized in the construction of a home or other shelter in a similar manner as adobe bricks are presently used. The mortar and foundation is prepared using a 30% solution. The bricks and foundation may be painted after they are dried with any type of paint.

The compound herein disclosed may be also used to prevent erosion of earth and ditches. The compound is very useful on dusty soil to prevent the blowing of dust.

Although this invention has been disclosed and illustrated with reference to particular applications, the compound involved is susceptible of numerous other applications which will be apparent to persons skilled in the art. The invention is, therefore, to be limited only as indicated by the scope of the appended claims.

EXAMPLE 1

To 97 gallons of a 100% acrylic latex emulsion (Rhoplex AC–34, Rohm & Haas), there are slowly added 25 pounds of aqueous sodium silicate (Silica N, Philadelphia Quartz Co.) with stirring. After the emulsion and silicate have been completely mixed, 3 pounds of diacetone alcohol are slowly added to the mixture with stirring. After the mixing has been completed, the concentrate mixture is packaged. The above formulation makes about 110 gallons of concentrate.

Substantially equivalent concentrates can be prepared by employing other acrylic latex emulsion, such as polymethyl acrylate, polyethyl methacrylate, polyisopropyl methacrylate and polybutyl acrylate latex emulsion in the above formulations.

EXAMPLE 2

To 900 pounds of a 100% acrylic latex emulsion (Rhoplex AC–33, Rohm & Haas Co.) there are slowly added 100 pounds of aqueous sodium silicate (Water Glass Grade) with stirring. After the emulsion and silicate have been thoroughly mixed, the concentrate is allowed to set for 1 hour, then is skimmed and packaged.

Rhoplex AC–33 is formed by copolymerizing a mixture of acrylic ester monomers comprised essentially of a major part of ethyl acrylate and a minor part of methyl methacrylate in amounts sufficient to provide the resulting copolymers with a second order transition temperature of 12° C. A small amount of methylacrylic acid is also present.

EXAMPLE 3

A concentrate is prepared according to the procedure of Example 2, employing 990 pounds of a 100% polymethyl acrylate and 10 pounds of aqueous sodium silicate (Silica E, Philadelphia Quartz Co.).

EXAMPLE 4

A concentrate is prepared according to Example 1, employing 960 pounds of a 100% acrylic latex emulsion, 30 pounds of an aqueous sodium silicate (Silica R, Philadelphia Quartz Co.) and 10 pounds of a 50:50 mixture by volume of ethylene glycol and diacetone alcohol.

EXAMPLE 5

A concentrate is prepared according to Example 1, employing 945 pounds of a 100% acrylic latex emulsion, 35 pounds of aqueous sodium silicate (Silica K, Philadelphia Quartz Co.), and 20 pounds of a 1:3 mixture of diethylene glycol and water.

EXAMPLE 6

To a 1000 gallon container containing 375 pounds of water, there are added about 17 pounds of diacetone alcohol. The mixture is stirred well, during which time about 5.85 liters (about 12 pounds) of anti-foaming agent (Nopco NXZ liquid) are added. After the mixture is completely mixed, about 2 pounds of a green color water dispersable dye are added with stirring followed by about 83 pounds of aqueous sodium silicate (Silica N). The resulting mixture is slowly added to 7000 pounds of a 100% acrylic latex emulsion (Rhoplex AC–34) with stirring. After the concentrate is completely stirred, it is allowed to set for one hour, skimmed and packaged.

EXAMPLE 7

To a 3500 gallon tank filled with 3000 gallons of water, there are added 90 gallons (about 800 pounds) of the concentrate of Example 6. The mixture is agitated to insure complete mixing. The resulting aqueous composition is sufficient for one acre of land. The composition is sprayed on highway land cuts. Best results are obtained by saturating the soil evenly to obtain a milky appearance on the surface; this will disappear about 5 to 10 minutes after application.

For porous soils the land can be pre-watered or the aqueous solution can be prepared in a more diluted form 4500:90 gallons water:concentrate. If the more dilute composition is applied, two applications will be necessary to insure that each acre of treated land is treated with at least 90 gallons of concentrate, preferably 100 to 110 gallons.

The concentrates of the present invention can all be suitably employed in the above described method of treating soil for erosion and dust control.

EXAMPLE 8

To a 10,000 gallon tank, there are added 4500 gallons of water, 90 gallons of the concentrate of Example 4 and 1 liter of Nopco NXZ liquid. The resulting mixture is thoroughly mixed. One thousand pounds of wood-fiber mulch are added to the aqueous composition and mixed therein to form a slurry. The slurry is hydraulically applied on the soil, the surface of the soil preferably having been weeded of vegetation. In areas that have already eroded, the slurry is applied in a thick layer to inhibit further erosion. After application—the above formulation is for one acre of land—the slurry is allowed to dry and cure.

The above method can also be practiced employing seed and/or fertilizer in the slurry to promote germination and vegetation growth. Alternatively, the above method can be practiced with the aqueous composition and seed and/or fertilizer alone without a mulch. The preferred mulches are fibrous natural products, such as wood fiber, hay, straw, cottonseed hulls and the like. Grass seeds are the seeds generally employed. The fertilizers are the normal agriculture fertilizers, including phosphates, urea, ammonium nitrate and the like.

EXAMPLE 9

In a large tank containing 1000 gallons of water there are added about 1 pound of an anti-foaming agent (Balab 748 anti-foaming agent, Balab, Incorporated) and 100 gallons of the concentrate of Example 1. The aqueous composition is thoroughly mixed.

The aqueous composition is added to a ton of soil in 10 gallon portions with mixing the agitation to form a soft moldable composition. The moldable composition is molded into brick shapes employing a brick mold. The brick shapes are allowed to air dry in the sun for four days. The bricks can then be employed in the preparation of one or two story structures. The bricks can be painted to further project them from erosion.

Other concentrate and aqueous composition formulations also can be employed in the above method.

EXAMPLE 10

Dried shaped bricks, prepared from water and soil are moistened with water and then saturated with an aqueous composition prepared from 2000 gallons of water, 110 gallons of the concentrate of Example 2 and about 1 pound of an anti-foaming agent. The treated bricks are then allowed to air dry in the sun after which time they can be used in construction and/or painted.

What is claimed is:

1. A concentrate which can be used to treat soil for erosion and dust control thereof which consists essentially of, by weight, between about 89% and about 99% of an aqueous latex emulsion of a homopolymer of a lower alkyl ester of acrylic acid or a lower alkyl ester of an alpha-lower alkyl acrylic acid, or a copolymer of said esters; and between about 1% and about 10% of an aqueous sodium silicate.

2. The concentate according to claim 1 containing between about 0.02% and about 1% of a water-soluble polyoxygenated alcohol.

3. The concentrate according to claim 1 containing at least about 0.2% of an anti-foaming agent.

4. The concentrate according to claim 1 containing at least 0.25% by weight of a wetting agent.

5. The concentrate according to claim 1 containing a water dispersed dye.

6. The concentrate according to claim 1 wherein said latex emulsion has a solids content of between about 45% and about 50%, a pH between 8 and 10, and a specific gravity of solids of about 1.15; and the aqueous sodium silicate has an alkalinity ratio of about 1:3.2 ($Na_2O$) and a density of about 41° Bé.

7. The concentrate according to claim 6 containing between about .2% and about 1% diacetone alcohol.

8. A concentrate that is used to treat soil for the erosion and dust control thereof as set forth in claim 1, wherein said concentrate contains:
   between about 95% and about 98% of said latex emulsion, a solids content of between about 45% and about 50%, a pH between 8 and 10, and a specific gravity of solids of about 1.15;

between about 2% and about 4% of aqueous sodium silicate having an alkalinity ratio of about 1:3.2 ($Na_2O:SiO_2$) and a density of about 41° Bé.; and between about 0.2% and about 1% of diacetone alcohol.

References Cited

UNITED STATES PATENTS

| | | | |
|---|---|---|---|
| 3,135,029 | 6/1964 | Cooper et al. | 260—29.6 S |
| 3,196,122 | 7/1965 | Evans | 260—29.6 S |
| 3,223,163 | 12/1965 | Koch et al. | 260—29.6 S |
| 3,437,625 | 4/1969 | Bonnel et al. | 260—29.6 S |
| 3,450,661 | 6/1969 | Neel et al. | 260—29.6 S |
| 766,938 | 8/1904 | Diefendorf | 264—333 |

FOREIGN PATENTS

| | | |
|---|---|---|
| 1,068,782 | 5/1967 | Great Britain. |

HAROLD D. ANDERSON, Primary Examiner

U.S. Cl. X.R.

47—9; 61—36; 111—1; 117—161 UZ; 260—29.6 ME